United States Patent
Aron et al.

(10) Patent No.: US 10,528,546 B1
(45) Date of Patent: Jan. 7, 2020

(54) FILE SYSTEM CONSISTENCY IN A DISTRIBUTED SYSTEM USING VERSION VECTORS

(71) Applicant: Cohesity, Inc., Santa Clara, CA (US)

(72) Inventors: Mohit Aron, Los Altos, CA (US); Ganesha Shanmuganathan, Santa Clara, CA (US); Tarang Vaish, Santa Clara, CA (US)

(73) Assignee: Cohesity, Inc., San Jose, CA (US)

( * ) Notice: Subject to any disclaimer, the term of this patent is extended or adjusted under 35 U.S.C. 154(b) by 460 days.

(21) Appl. No.: 14/852,363

(22) Filed: Sep. 11, 2015

(51) Int. Cl.
*G06F 17/30* (2006.01)
*G06F 16/23* (2019.01)
*G06F 16/11* (2019.01)
*G06F 16/951* (2019.01)

(52) U.S. Cl.
CPC ........ *G06F 16/2365* (2019.01); *G06F 16/128* (2019.01); *G06F 16/2308* (2019.01); *G06F 16/951* (2019.01)

(58) Field of Classification Search
CPC .............. G06F 17/30371; G06F 16/2365
See application file for complete search history.

(56) References Cited

U.S. PATENT DOCUMENTS

| | | | | |
|---|---|---|---|---|
| 4,761,785 | A * | 8/1988 | Clark | G06F 11/1076 714/6.12 |
| 5,737,601 | A * | 4/1998 | Jain | G06F 17/30575 707/622 |
| 7,552,223 | B1 * | 6/2009 | Ackaouy | G06F 17/30067 707/999.01 |
| 2007/0026373 | A1 * | 2/2007 | Suriyanarayanan | G06F 8/00 434/322 |
| 2010/0076930 | A1 * | 3/2010 | Vosshall | G06F 17/30575 707/638 |
| 2012/0016849 | A1 * | 1/2012 | Garrod | G06F 16/2329 707/695 |
| 2012/0084272 | A1 * | 4/2012 | Garces-Erice | G06F 16/13 707/698 |
| 2013/0322760 | A1 * | 12/2013 | Robinson | G06K 9/0063 382/191 |

* cited by examiner

*Primary Examiner* — Usmaan Saeed
*Assistant Examiner* — William P Bartlett
(74) *Attorney, Agent, or Firm* — Van Pelt, Yi & James LLP

(57) ABSTRACT

A method and apparatus for maintaining file system consistency in a distributed system using version vectors is presented. A method generally includes comparing incarnation and transaction identifiers of a current version vector associated with a file with incarnation and transaction identifiers of a last completed version vector associated with the file. Upon determining that a current version vector reflects operations on the file that are either earlier than or the same as the identifiers in the last completed version vector, the node performing one or more file system operations on the file.

15 Claims, 6 Drawing Sheets

FILE SYSTEM CONSISTENCY IN A DISTRIBUTED SYSTEM USING VERSION VECTORS

BACKGROUND

Field

Embodiments of the present disclosure generally relate to a distributed system, and more specifically maintaining file system consistency in a distributed system using version vectors.

Description of the Related Art

In system where a single node accesses a file (i.e., performs read and write operations on a file), tracking the order of operations can be performed using a variety of identifiers. For example, a system can attach a timestamp, generated from a system clock, to each operation, and operations on a file can be ordered from earliest to latest by examining the timestamp attached to each operation. Maintaining file system consistency in a single node system, thus, is trivial.

In a distributed system with multiple nodes, each node generally maintains an independent clock. Each node's clock can be synchronized periodically with a master time source, such as the atomic clock maintained by the National Institute of Standards and Technology (NIST) or other time servers (e.g., via Network Time Protocol messages). While each node may be substantially synchronized with each other (and the master time source) immediately after synchronization, clocks for each node may drift differently over time.

Multiple nodes in a distributed system may, at times, attempt to access the same file. If multiple nodes attempt to use clock-based locking mechanisms, for example, differences in timestamps provided by each system may not accurately identify the node that has obtained a lock on the file. Thus, it is possible for inconsistencies to be introduced in a distributed file system (e.g., from multiple nodes attempting to edit the same file).

In some cases, a node may crash while performing operations on a file. For example, a node may crash while executing file write tasks. The target file may thus be left in an inconsistent state (e.g., from a write operation being partially performed). Successive file access procedures by other nodes may result in some nodes performing file operations on a previous version of the file, while other nodes perform file operations on the partially edited version of the file.

SUMMARY

The present disclosure generally provides a method for ensuring file system consistency in a distributed system by a node. The method generally includes comparing incarnation and transaction identifiers of a current version vector associated with a file with incarnation and transaction identifiers of a last completed version vector associated with the file. Upon determining that a current version vector reflects operations on the file that are either earlier than or the same as the identifiers in the last completed version vector, the node performing one or more file system operations on the file.

Another embodiment of the present disclosure provides a computer readable storage medium having instructions, which, when executed on a processor, performs an operation for ensuring file system consistency in a distributed system by a node. The operation generally includes comparing incarnation and transaction identifiers of a current version vector associated with a file with incarnation and transaction identifiers of a last completed version vector associated with the file. Upon determining that a current version vector reflects operations on the file that are either earlier than or the same as the identifiers in the last completed version vector, the node performing one or more file system operations on the file.

Still another embodiment of the present disclosure includes a processor and a memory storing a program, which, when executed on the processor, performs an operation for ensuring file system consistency in a distributed system by a node. The operation generally includes comparing incarnation and transaction identifiers of a current version vector associated with a file with incarnation and transaction identifiers of a last completed version vector associated with the file. Upon determining that a current version vector reflects operations on the file that are either earlier than or the same as the identifiers in the last completed version vector, the node performing one or more file system operations on the file.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments presented herein describe techniques for maintaining file system consistency in a distributed system. In particular, embodiments described herein use version vectors to maintain file system consistency in a distributed system. A version vector generally identifies file operations using a node identifier, an incarnation of the node, and a transaction. Each time a node performs a transaction on a file or file metadata, the system increments the transaction identifier of a vector clock for the node, updates the version vector with the new vector clock, and commits the version vector to a centralized store.

In one embodiment, a node identifier is generally a constant value, defined a priori, for each node. Each time a node restarts (either due to a scheduled restart or during a recovery from an unscheduled restart), the node increments its incarnation identifier and resets the transaction identifier to 0. A temporal order of operations from a node can be ordered according to the incarnation and transaction identifiers. For example, an operation with a higher incarnation identifier generally was performed after an operation with a lower incarnation identifier. Meanwhile, within the same incarnation of a node, higher transaction identifier values indicate operations that were performed later than operations with lower transaction identifier values.

In some embodiments, a version vector for a file generally includes a vector clock representing the most recent transaction performed by each node in a distributed system. A file can have a current version vector, representative of the current operations being performed on the file, and a latest completed version vector, representative of the most recent successfully completed operation performed on the file. Using the current and latest completed version vectors, a node can determine whether another node is currently performing operations on a file and whether or not it is safe for the node to access the file. If the node determines that it is safe to access the file, the node can additionally determine if entity data is inconsistent and, if so, attempt to rectify the inconsistency.

Advantageously, using version vectors for file operations in a distributed system allows for the system to maintain file system consistency when multiple nodes perform file operations (e.g., read and write tasks) on the same file. For example, nodes can delay reading a file if a current version vector reflects a more recent operation on the file (i.e., by a second node) than the latest completed version vector. When the second node finishes performing operations on the file, the second node updates the current version vector, and subsequent operations on the file are performed on the edited file. Further, if it is safe to perform operations on a file, nodes can examine a file for inconsistencies and attempt to rectify the inconsistencies in the file.

Figure 1:
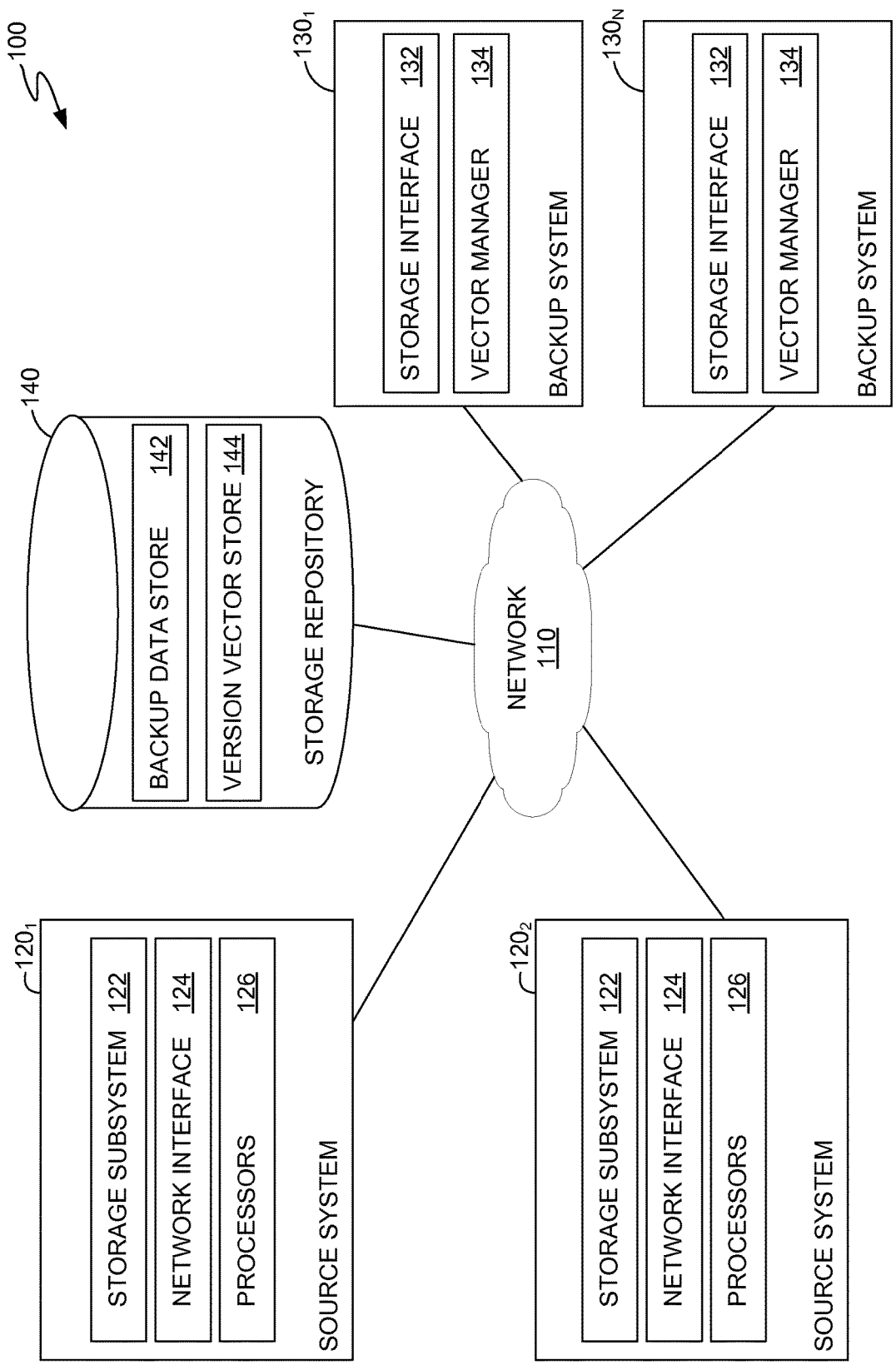
FIG. 1 illustrates an example of a networked computing environment, according to one embodiment.

FIG. 1 illustrates an example computing environment 100, according to an embodiment. As illustrated, computing environment 100 includes a plurality of source systems 120, a plurality of backup systems 130, and storage repository 140, connected to a network 110.

Each of the plurality of source systems 120 generally includes a storage subsystem 122, one or more network interfaces 124, and one or more processors 126. A source system 120 may provide various services. For example, an internet server may be installed on a source system 120 to provide web services to other machines. Some source systems 120 may host databases (e.g., relational databases or NoSQL-type data repositories) that may be accessed by one or more web services. In a development environment, one or more source systems 120 may be production machines on which a current version of software is deployed. Other source systems 120 may host code repositories and act as test systems on which software updates are deployed in a test environment before the updates are deployed on the production machines.

In some cases, source system 120 may host one or more virtual machines that may share resources (i.e., storage subsystem 122, network interfaces 124, processors 126, and/or other devices connected to source system 120). The virtual machines may be deployed similarly to physical machines in a larger system (e.g., a website host, development environment, etc.) as described above. In some cases, virtual machines may be deployed on a per-user basis in a computer network.

Storage subsystem 122 generally provides a mechanism to store files and metadata on a source system 120. Storage subsystem 122 may provide access to files and metadata, for example using a directory-subdirectory structure, a database-driven file repository. In some cases, storage subsystem 122 may be configured to use a network file system structure, which allows other systems in network 110 to access data on a source system 120 as if storage subsystem 122 were one or more local drives on the other systems.

One or more backup systems 130 may be deployed in computing environment 100. Each backup system 130 generally includes a storage interface 132 and a vector manager 134. Storage interface 132 and vector manager 134 are illustrated as separate modules; however, in some cases, vector manager 134 may be implemented as a component within storage interface 132.

Storage interface 132 generally includes one or more interfaces for accessing files stored on a source system 120, as well as files and other data stored in storage repository 140. During backup operations, storage interface 132 ingests data from one or more source systems 120 and commits the ingested data to a storage repository 140. In an initial backup of a source system 120, storage interface 132 may write a bit-by-bit copy of the data obtained from storage subsystem 122 at source system 120 to backup data stored in storage repository 140. For subsequent backup operations of source system 120, storage interface 132 may ingest data from storage subsystem 122 at the determined data ingestion rate and compare the ingested data to data previously stored in storage repository 140.

As storage interface 132 performs file operations on a source system 120 and/or data or metadata stored in storage repository 140, vector manager 144 examines a current version vector associated with a file and the last completed version vector, which may be accessed from a centralized data store (e.g., version vector store 144). Each file is generally associated with a version vector including vector information for each node (e.g., backup system 130) in the system. That is, in a system of n nodes, the version vector includes an entry for each of the n systems.

As discussed above, a vector for a particular node includes an identification of the node, the node's incarnation, and the transaction ID for the incarnation. As nodes are restarted, the node incarnation is incremented, and the transaction ID is reset to 0, and vector manager 134 can thus determine that an operation with a node incarnation of n+1 and a transaction ID of 0 followed an operation with a node incarnation of n and a transaction ID of m. As an active node performs further operations, the node generates vector clocks with the constant node ID and the same incarnation ID, but with incremented transaction IDs. In some cases, the version vector may be represented as a 2-tuple of (node ID, (incarnation ID, transaction ID)), where the 2-tuple of (incarnation ID, transaction ID) identifies a file operation by the node.

When a node (e.g., backup system 130) accesses a file, vector manager 134 queries a central repository for the most recent transaction ID for a given incarnation of a backup system 130. Vector manager 134 increments the transaction ID and generates an updated version clock including the backup system's unique identifier, the backup system's incarnation identifier, and the incremented transaction ID. After vector manager 134 generates a new vector clock for the operation, vector manager 134 generates an updated version vector including the updated version clock and associates the updated version vector with the file (e.g., by storing the updated version vector in metadata associated with the file or by storing the updated version vector in a current transaction store in storage repository 140). After backup system 130 finishes working with the file, backup system 130 commits the updated version vector to a latest completed version vector repository (e.g., version vector store 144 of storage repository 140).

In some cases, a vector manager 134 at a backup system 130 can examine a current version vector associated with a file with the file's latest completed version vector and determine if it is safe to perform operations on the file. For each backup system 130 in the computing environment 110, vector manager 134 examines the vector clocks of the current version vector to the same information in the file's latest completed version vector (e.g., for the vector clock for each backup system, compare the 2-tuple of incarnation ID and transaction ID in the current version vector and the latest completed version vector). If each backup system's vector clock is earlier than or the same as the backup system's latest completed vector clock, vector manager 134 determines that the backup system can read the specified file. In some cases, vector manager 134 can examine the file for inconsistencies and attempt to rectify those inconsistencies. Otherwise, if the current vector clock for any backup system is newer than the corresponding vector clock in the last completed version vector (i.e., the 2-tuple of incarnation ID and transaction ID for a given backup system reflects that the current version vector is newer than the last completed version vector), vector manager 134 can determine that file access may not be safe (i.e., the file may not be consistent). Vector manager 134 may thus queue the file operations until other backup systems using the file commit their changes to the file.

Backup engine 134 is connected to storage repository 140. Storage repository 140 may be a distributed storage system and may contain backup data from one or more source systems 120. Storage repository 140 may include a backup data store 142 and transaction data 144.

Backup data store 142 may implement a distributed file system (e.g., a storage system compliant with the Network File System protocol) to allow backup engine 134 to write backup data to backup data store 142. In some cases, backup data store may implement a directory structure in which backup data is stored.

Backup data for a source system may be stored in backup data store 142 as an initial backup and one or more snapshots reflecting changes to the source system at a given point in time. When a snapshot is generated, backup engine 134 may store the snapshot in backup data store 142 as a series of pointers to previously stored data blocks for data that has not changed from the previous snapshot and copies of data that has changed since the previous snapshot. Thus, a snapshot generally takes up a smaller amount of space in backup data store 142 than the initial backup.

Version vector store 144 stores version vectors for each file accessed by backup system(s) 130 in computing environment 100. In some cases, version vector store 144 may include a first repository for current version vectors associated with files accessed by backup system(s) 130 and a second repository for the latest completed version vector for each file. As discussed above, when a backup system 130 performs read/write operations on a file, the backup system 130 first updates the current version vector with a vector clock generated for the backup system including the backup system's incarnation ID and an incremented transaction ID. After backup system 130 is finished with the file, the backup system 130 updates the last completed version vector using the generated vector clock.

Figure 2:
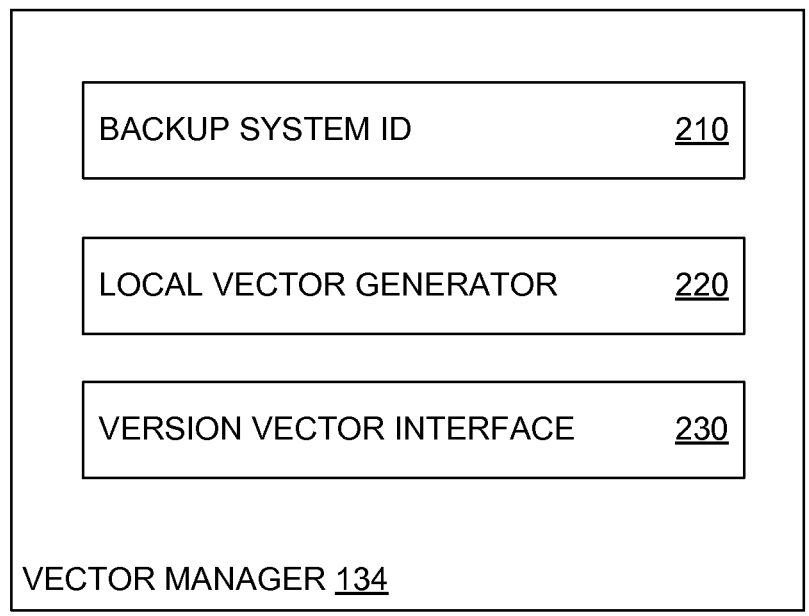
FIG. 2 illustrates a block diagram of an example version vector manager, according to one embodiment.

FIG. 2 illustrates a block diagram of an example vector manager 134, according to an embodiment. As illustrated, vector manager includes a backup system ID 210, local vector 220, and version vector interface 230.

As discussed above, backup system ID 210 may be set to a constant value that does not change during the life of the backup system 130 of which vector manager 134 is a component. Backup system ID 210 may be, for example, a GUID or an identifier unique to computing environment 110, and may be stored in persistent storage at backup system 130.

Local vector generator 220 obtains recent transaction data for the backup system 130 from storage repository 140 (specifically, from version vector store 144) and generates vector clocks for file operations. As discussed above, when a backup system 130 starts up, the backup system increments its incarnation ID. In an embodiment, to determine the previous incarnation ID, local vector generator 220 can query version vector store 144 (e.g., via version vector interface 230) for the most recent version vector for the backup system committed to the version vector store. Local vector generator 220 extracts the incarnation ID from the most recent version vector, increments the incarnation ID, and stores the new incarnation ID in memory. Additionally, local vector generator 220 resets the transaction ID to 0. In some cases, local vector generator 220 may maintain a local copy of the most recent incarnation ID in persistent memory at backup system 130. As backup system 130 performs read/write tasks on a file, local vector generator 220 generates a vector clock including backup system ID 210, the incarnation ID generated by local vector generator 220 on backup system startup, and an incremented transaction ID.

Version vector interface 230 provides an interface for vector manager 134 to examine version vectors stored in storage repository 140 (specifically, version vector store 144) and commit new version vector data to version vector store 144. In some cases, version vector interface 230 may first store an updated version vector in a first data store corresponding to current file operations in a distributed file system. When and after a backup system 130 completes read/write tasks on a specified file, version vector 230 commits the updated version vector to a second data store corresponding to the last completed operations on files in the distributed file system.

Figure 3:
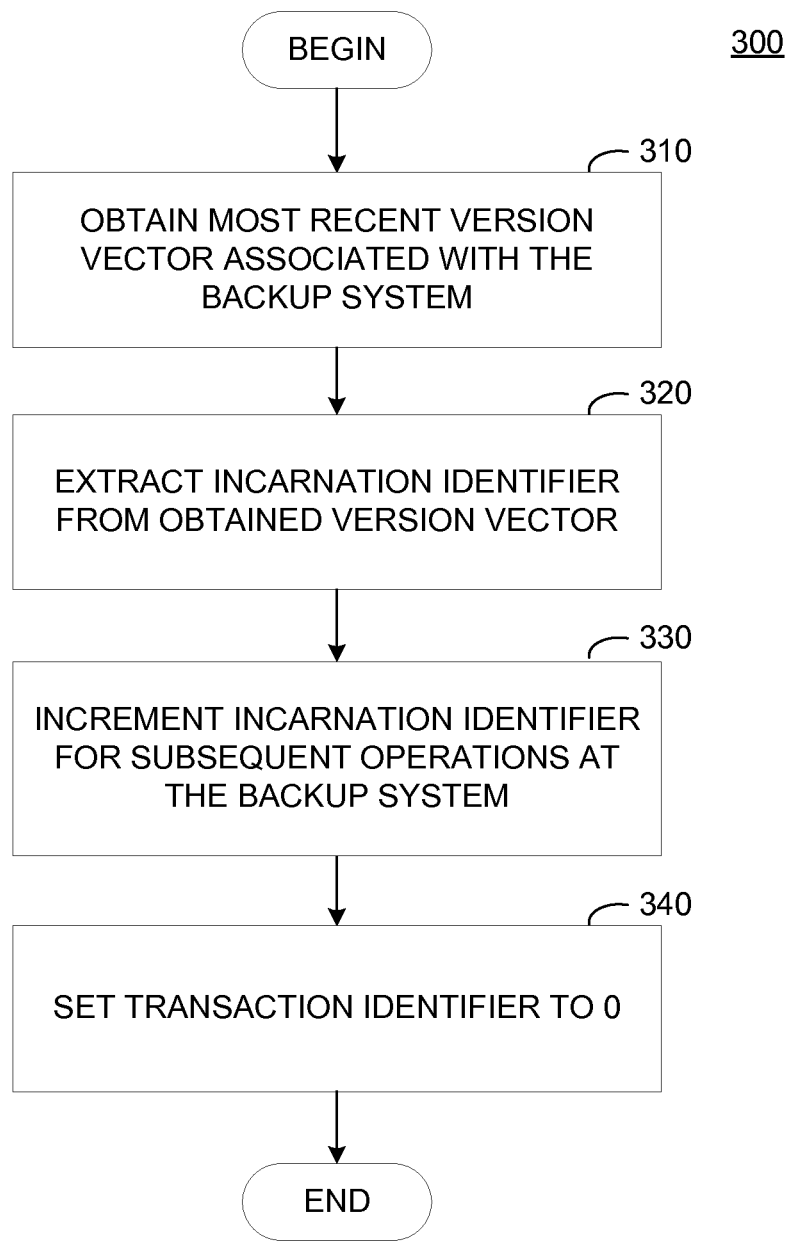
FIG. 3 illustrates a method for initializing an incarnation identifier on system startup, according to one embodiment.

FIG. 3 illustrates an example method 300 for initializing vector clock information at a backup system after system startup, according to some embodiments. Method 300 begins at step 310, where the backup system obtains the latest version vector associated with the backup system. To obtain the latest version vector associated with the backup system, the backup system can query a version vector repository (e.g., version vector store 144 in storage repository 140) for the most recent transaction performed by the backup system.

At step 320, the backup system extracts the incarnation identifier from the obtained version vector. At step 330, the backup system increments the incarnation identifier for subsequent file operations to be performed by the backup system. As discussed above, when the backup system increments the incarnation identifier, the backup system can save the current (incremented) incarnation identifier to persistent storage at the backup system to avoid repeated transactions on version vector store 144. Finally, at step 340, the backup system sets the transaction identifier to 0. Accordingly, the first backup operation to be performed by backup system 130 will be the 2-tuple (backup system ID 210, (updated incarnation ID, 0)).

Figure 4:
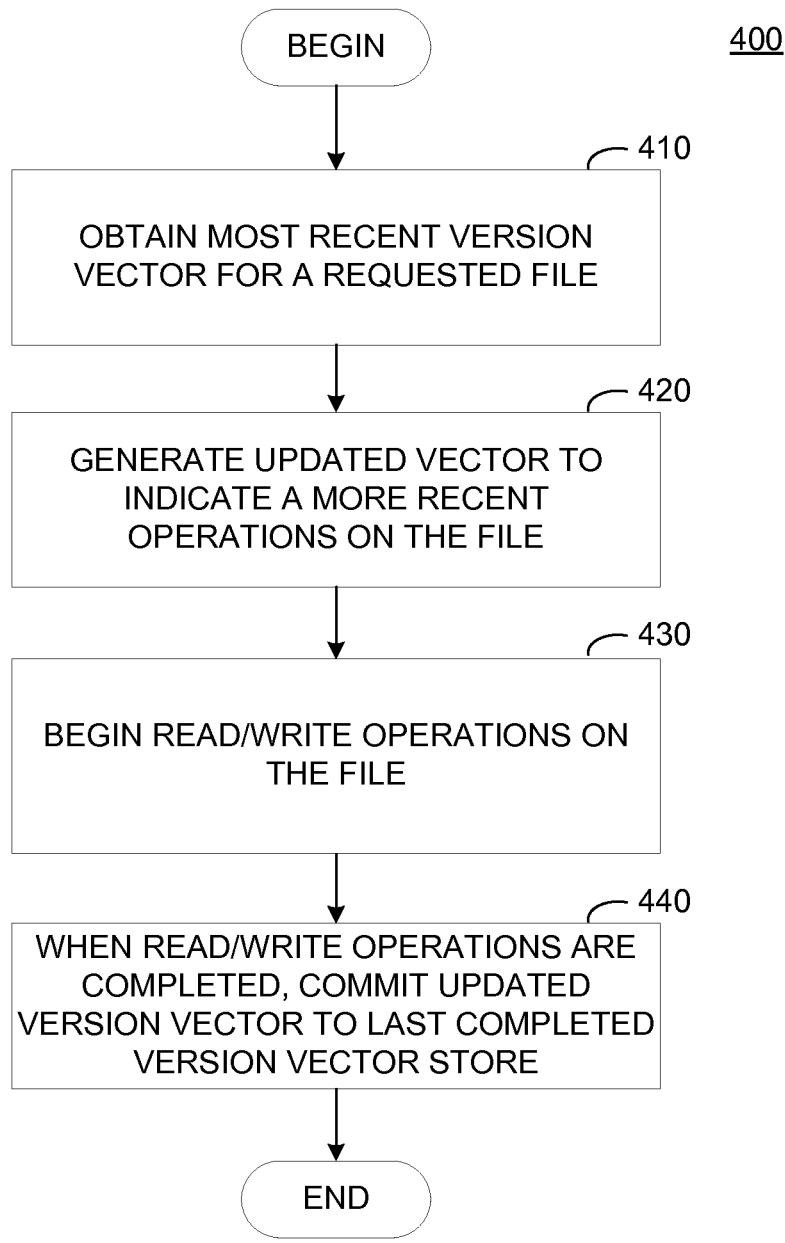
FIG. 4 illustrates a method for accessing a file and updating a version vector associated with the file, according to one embodiment.

FIG. 4 illustrates example operations 400 that may be performed by a backup system to perform read/write operations on a file and generate an updated version vector for the file, according to an embodiment. Operations 400 begin at step 410, where the backup system obtains a most recent version vector for a requested file. At step 420, the backup system generates an updated vector to indicate more recent operations on the file. As discussed above, a backup system can maintain a local copy of the backup system's incarnation ID and transaction ID. Before performing read/write operations on a specified file, the backup system generates a vector clock, which may be represented as the 2-tuple (backup system ID 210, (updated incarnation ID, previous transaction ID+1)), and generates an updated version vector to include the updated vector clock for the backup system.

At step 430, the backup system performs read/write operations on the file. As discussed above, before the backup system begins performing read/write operations on the file, the backup system can commit the updated version vector to a repository for maintaining a current version vector for a file. At step 440, after the backup system completes read/write operations on the file, the backup system commits the updated version vector to a last completed version vector store.

Figure 5:
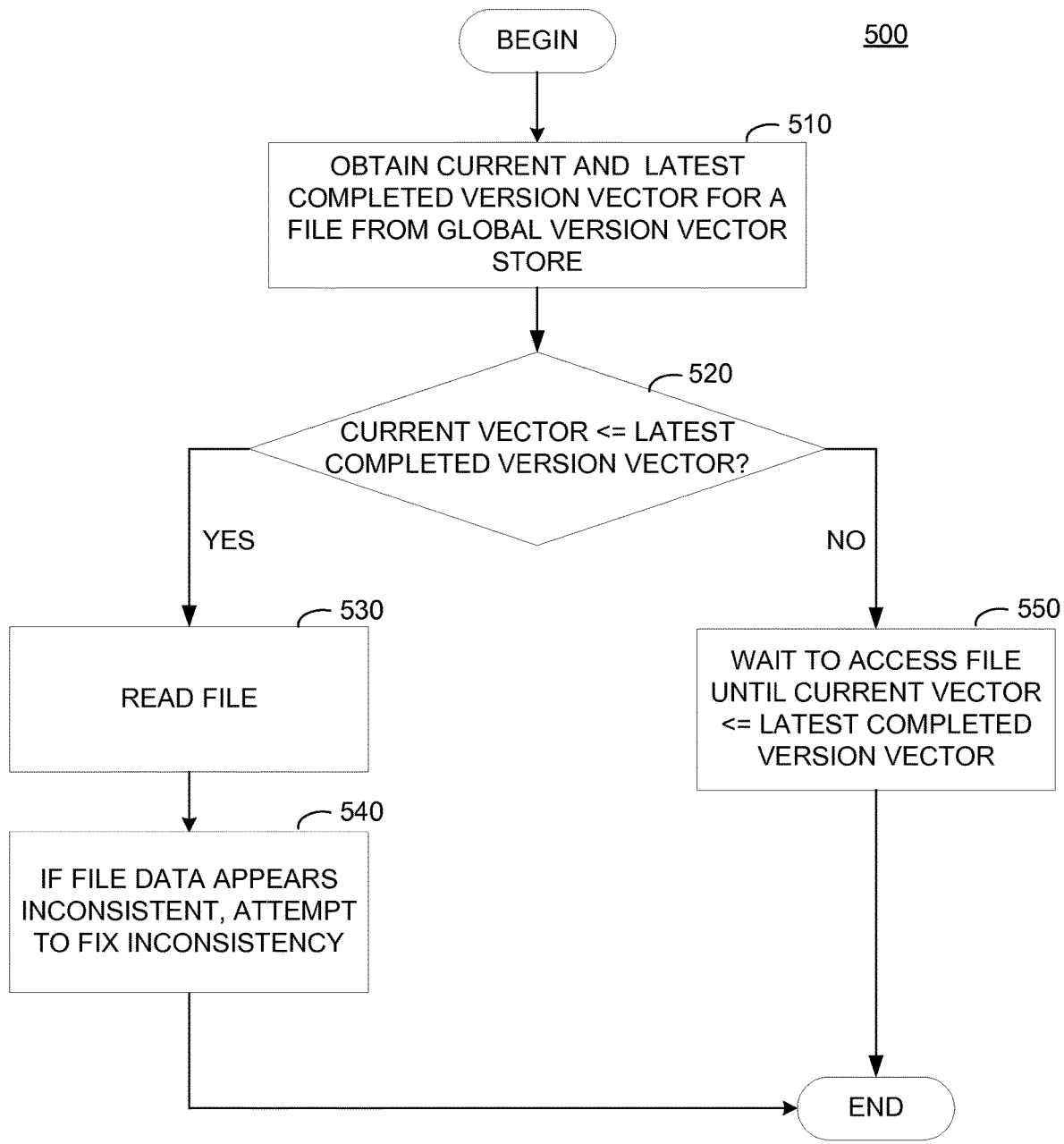
FIG. 5 illustrates a method for determining whether an entity is in a consistent state according to version vectors associated with the entity, according to one embodiment.

FIG. 5 illustrates example operations 500 for determining if an inconsistency exists for a file based on current and last completed version vector information, according to an embodiment. Operations 500 begin at step 510, where a backup system obtains the current and latest completed version vector for an entity from the global version vector store.

At step 520, the backup system compares the current version vector to the latest completed version vector. As discussed above, a version vector generally includes a number of entries corresponding to the number of backup systems 130 in a computing environment. For each backup system 130, identified by a unique backup system identifier in entries in the version vector, the backup system compares the incarnation ID and transaction ID in the current vector to the same information in the latest completed version vector. If the data in the current version vector is earlier than or the same as corresponding data in the latest completed version vector, backup system determines that it is safe to perform read operations on the file.

Thus, at step 530, the backup system reads the specified file, and, at step 540, the backup system examines the file to determine whether or not an inconsistency exists for the file. If the backup system determines that an inconsistency exists for the file, the backup system may attempt to fix the inconsistency. For example, if a file was partially edited, the backup system can roll back the file to a previous, stable version of the file. If a cached version of the edited file exists, the backup system can instead attempt to commit the edited file to storage repository 140. Regardless, resolving file inconsistencies generally provides a consistent file that other backup systems 130 in a computing environment can use for future operations.

If the data in the current version vector indicates that a later transaction than the latest completed transaction exists, backup system 130 can infer that the file is in an inconsistent state (e.g., another system is editing the file). Thus, at step 550, backup system 130 waits to access the file until the current version vector reflects operations that are earlier than or the same as the operations stored in the latest completed version vector. For example, if a first system is performing a write operation on a file (e.g., updating data stored in the file or deleting the file in its entirety) and a second system attempts to access the same file, the second system will not be able to access the file until after the first system commits any changes and an updated latest completed version vector to storage subsystem 122 of a source system 120 and/or storage repository 140. After the first system commits the changes to storage subsystem 122 of a source system 120 or storage repository 140, the second system can then access the updated file (or, if the first system deleted the file, receive a message indicating that the file no longer exists).

Figure 6:
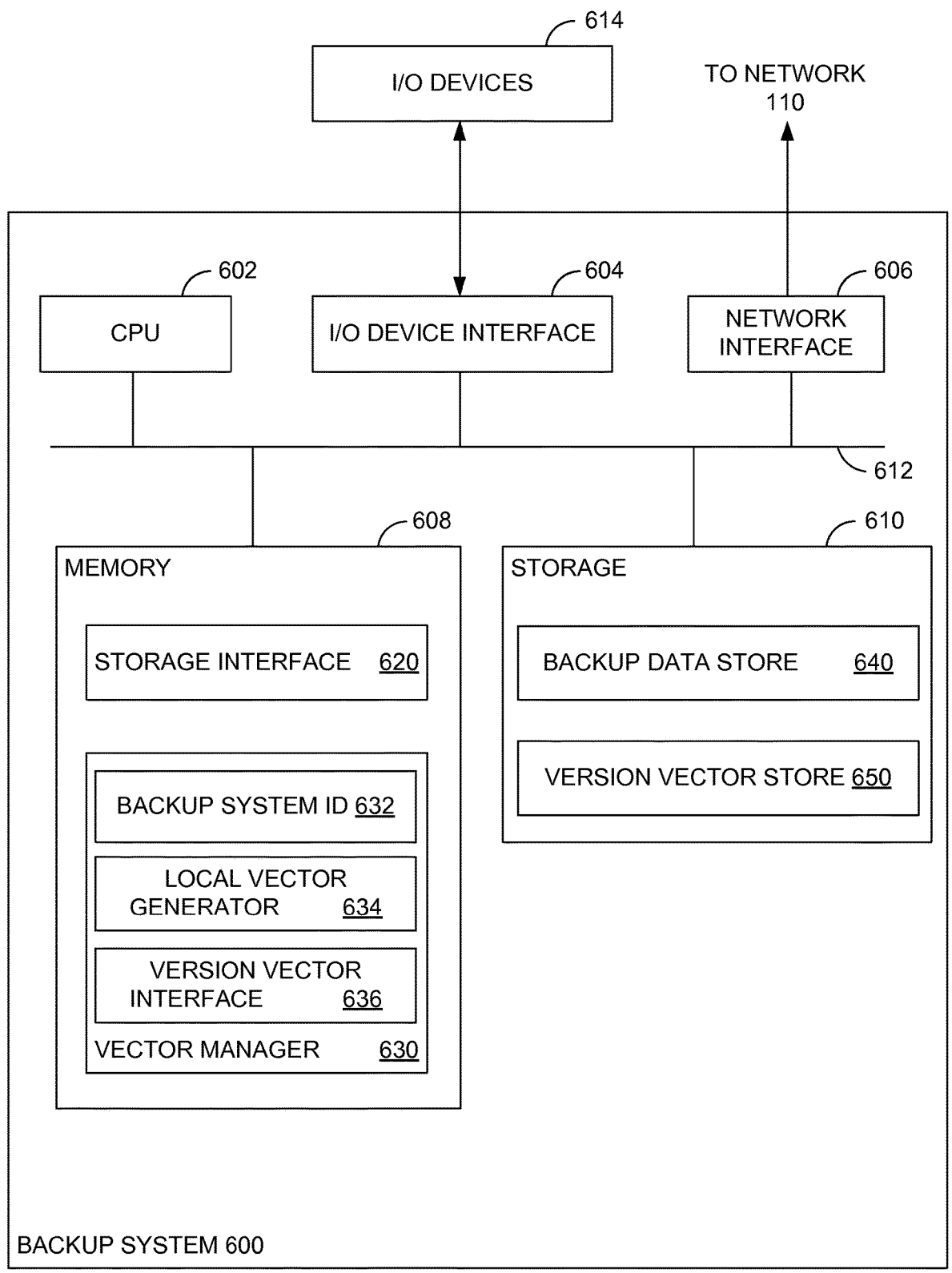
FIG. 6 illustrates an example computing system for using version vectors in a distributed system, according to one embodiment.

FIG. 6 illustrates an example backup system 600 that uses information about resource utilization at a backup source to dynamically adjust a data ingestion rate for backup operations, according to an embodiment. As shown, the backup system 600 includes, without limitation, a central processing unit 602, one or more I/O device interfaces 604, which may allow for the connection of various I/O devices 614 (e.g., keyboards, displays, mouse devices, pen input, etc.) to the backup system 600, network interface 606, a memory 608, storage 610, and an interconnect 612.

CPU 602 may retrieve and execute programming instructions stored in the memory 608. Similarly, the CPU 602 may retrieve and store application residing in the memory 608. The interconnect 612 transmits programming instructions and application data among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes a storage interface 620 and a vector manager 630. As discussed above, storage interface 620 allows backup system 600 to obtain data from a backup source and commit backup data to storage 610. Storage interface 620 may ingest data from a backup source, and as storage interface 620 ingests data from a backup source, storage interface 620 compares the ingested data to corresponding data in a previous backup stored in storage 610. If the ingested data and the previously backed up data matches, storage interface 620 writes a pointer to the previously backed up data to storage 610; otherwise, storage interface 620 writes the ingested data to storage 610. When storage interface 620 completes backup operations on the source system, storage interface 620 commits a record of the backup to storage 610. In some cases, storage interface 620 can use information from vector manager 630 to monitor for file system inconsistencies (e.g., on a per-file basis). If storage interface 620 detects file system inconsistencies (e.g., a partial edit performed on a file), storage interface 620 can attempt to rectify the inconsistencies by rolling the affected files back to a known consistent state or attempting to commit edits to the affected files (e.g., from cached data).

As shown, vector manager 630 includes a backup system ID 632, local vector generator 634, and version vector interface 636. Backup system ID 632 may be a predefined constant value that is unique to the backup system 600 (e.g., a GUID or an identifier that is unique within the computing environment in which backup system 600 operates).

Local vector generator 634 is generally configured to obtain the most recent version vector associated with backup system 600 each time backup system 600 starts up. Local vector generator 634 extracts the incarnation ID from the most recent version vector and increments the incarnation ID to represent a new instance of the backup system operating. Concurrently, local vector generator 634 resets the transaction ID for the backup system 600 to 0. As backup system 600 performs read and/or write operations on a file, local vector generator 634 generates updated vector clocks using the backup system ID 642, the current incarnation ID determined on system startup, and an incremented transaction ID relative to the last transaction performed by backup system 600.

Version vector interface 646 provides an interface for local vector generator 634 to obtain version vectors from and write version vectors to storage 610 (e.g., to version vector store 650). On system startup, local vector generator 644 uses version vector interface 646 to obtain the most recent version vector associated with the backup system 600. As backup system 600 performs backup operations on various source systems, local vector generator 634 uses version vector interface 646 to first write an updated version vector to a repository for tracking current file operations. After the backup system completes read/write operations on the file, local vector generator uses version vector inter 646 to commit the updated version vector to a repository for storing the latest completed file transaction.

As shown, storage 610 includes a backup data store 640 and a version vector store 650. Storage 610 may be configured as a network file store (NFS) accessible by one or more remote systems. Backup data store 640 generally includes backup data from one or more source systems. As discussed above, backup data may include a base, bit-by-bit update. Subsequent updates may generate a plurality of pointers to unchanged data from a previous update and bit-by-bit data blocks corresponding to changed or new data. Version vector store 650 may be a persistent data store, and version vector store 650 generally stores information about transactions performed on files stored on various devices in a computing environment.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

What is claimed is:

1. A method, comprising:

receiving, at a backup node of a distributed backup system comprising a plurality of backup nodes, a request to perform one or more file system operations on a file;

obtaining, by the backup node, a current version vector associated with the file from a first data repository and a last completed vector associated with the file from a second data repository, wherein the first data repository is configured to store current version vectors associated with files accessed by the plurality of backup nodes and the second data repository is configured to store last completed version vectors for each file accessed by the plurality of backup nodes, wherein a storage repository includes the first data repository and the second data repository, wherein the storage repository is separate from the plurality of backup nodes, wherein the current version vector associated with the file is comprised of a first incarnation identifier and a first transaction identifier and the last completed vector associated with the file is comprised of a second incarnation identifier and a second transaction identifier;

comparing, by the backup node, data of the current version vector with data of the last completed vector at least in part by:

comparing the first incarnation identifier of the current version vector associated with the file with the second incarnation identifier of the last completed version vector associated with the file, wherein an incarnation identifier indicates a number of times one of the one or more nodes of the distributed backup system has restarted; and comparing the first transaction identifier of the current version vector associated with the file with the second transaction identifier of the last completed version vector associated with the file, wherein a transaction identifier indicates a number of transactions associated with the incarnation identifier;

determining, by the backup node, that the data of the current version vector is greater than the data of the last completed version vector, wherein the data of the current version vector being greater than the data of the last completed version vector indicates the file is in an inconsistent state;

in response to determining that the current version vector comprising the first incarnation identifier and the first transaction identifier is the greater than the data of the last completed version vector comprising the second incarnation identifier and the second transaction identifier, waiting to access the file until the current version vector is less than or equal to the last completed version vector stored in the second data repository; and in response to the current version vector comprising the first incarnation identifier and the first transaction identifier being less than or equal to the data of the last completed version vector comprising the second incarnation identifier and the second transaction identifier accessing the file at least in part by:
reading the file;
determining that an inconsistency for the file exists; and
fixing the inconsistency at least in part by rolling back the file to a previous stable version of the file.

2. The method of claim 1, wherein fixing the inconsistency in the file comprises attempting to update the file based on a cached copy of a file update.

3. The method of claim 1, further comprising performing the one or more file system operations on the file, wherein performing the one or more file system operations on the file comprises:
generating a vector clock for the backup node, the vector clock including a corresponding incarnation identifier and a corresponding incremented transaction identifier relative to a previous transaction performed by the backup node;
updating the current version vector associated with the file based on the generated vector clock;
performing one or more read or write operations on the file; and
upon completion of the one or more read or write operations, updating the latest completed version vector associated with the file based on the generated vector clock.

4. The method of claim 1, further comprising:
restarting the backup node;
obtaining an incarnation identifier from a previous version vector associated with the backup node; and
resetting the first incarnation identifier and the first transaction identifier, wherein resetting includes incrementing the first incarnation identifier relative to a previous incarnation identifier and setting the first transaction identifier to an initial, sequential value.

5. The method of claim 1, wherein the current version vector and last completed version vector further comprises a unique identifier of the backup node.

6. A computer program product, the computer program product being embodied in a non-transitory computer readable medium and comprising instructions for:
receiving, at a backup node of a distributed backup system comprising a plurality of backup nodes, a request to perform one or more file system operations on a file;
obtaining, by the backup node, a current version vector associated with the file from a first data repository and a last completed vector associated with the file from a second data repository, wherein the first data repository is configured to store current version vectors associated with files accessed by the plurality of backup nodes and the second data repository is configured to store last completed version vectors for each file accessed by the plurality of backup nodes, wherein a storage repository includes the first data repository and the second data repository, wherein the storage repository is separate from the plurality of backup nodes, wherein the current version vector associated with the file is comprised of a first incarnation identifier and a first transaction identifier and the last completed vector associated with the file is comprised of a second incarnation identifier and a second transaction identifier;
comparing, by the backup node, data of the current version vector with data of the last completed vector at least in part by:
comparing the first incarnation identifier of the current version vector associated with the file with the second incarnation identifier of the last completed version vector associated with the file, wherein an incarnation identifier indicates a number of times one of the one or more nodes of the distributed backup system has restarted; and
comparing the first transaction identifier of the current version vector associated with the file with the second transaction identifier of the last completed version vector associated with the file, wherein a transaction identifier indicates a number of transactions associated with the incarnation identifier;
determining, by the backup node, that the data of the current version vector is greater than the data of the last completed version vector, wherein the data of the current version vector being greater than the data of the last completed version vector indicates the file is in an inconsistent state;
in response to determining that the current version vector comprising the first incarnation identifier and the first transaction identifier is the greater than the data of the last completed version vector comprising the second incarnation identifier and the second transaction identifier, waiting to access the file until the current version vector is less than or equal to the last completed version vector stored in the second data repository; and
in response to the current version vector comprising the first incarnation identifier and the first transaction identifier being less than or equal to the data of the last completed version vector comprising the second incarnation identifier and the second transaction identifier, accessing the file at least in part by:
reading the file;
determining that an inconsistency for the file exists; and
fixing the inconsistency at least in part by rolling back the file to a previous stable version of the file.

7. The computer program product of claim 6, wherein fixing the inconsistency in the file comprises attempting to update the file based on a cached copy of a file update.

8. The computer program product of claim 6, further comprising performing the one or more file system operations on the file, wherein performing the one or more file system operations on the file comprises:
generating a vector clock for the backup node, the vector clock including a corresponding incarnation identifier and a corresponding incremented transaction identifier relative to a previous transaction performed by the backup node;
updating the current version vector associated with the file based on the generated vector clock;
performing one or more read or write operations on the file; and
upon completion of the one or more read or write operations, updating the latest completed version vector associated with the file based on the generated vector clock.

9. The computer program product of claim 6, further comprising instructions for:
restarting the backup node;
obtaining an incarnation identifier from a previous version vector associated with the node; and
resetting the first incarnation identifier and the first transaction identifier, wherein resetting includes incrementing the first incarnation identifier relative to a previous incarnation identifier and setting the first transaction identifier to an initial, sequential value.

10. The computer program product of claim 6, wherein the current version vector and last completed version vector further comprises a unique identifier of the backup node.

11. A system comprising:
a processor configured to:
receive a request to perform one or more file system operations on a file;
obtain a current version vector associated with the file from a first data repository and a last completed vector associated with the file from a second data repository, wherein the first data repository is configured to store current version vectors associated with files accessed by a plurality of backup nodes and the second data repository is configured to store last completed version vectors for each file accessed by the plurality of backup nodes, wherein a storage repository includes the first data repository and the second data repository, wherein the storage repository is separate from the plurality of backup nodes, wherein the current version vector associated with the file is comprised of a first incarnation identifier and a first transaction identifier and the last completed vector associated with the file is comprised of a second incarnation identifier and a second transaction identifier;
compare data of the current version vector with data of the last completed vector, wherein to compare data of the current version vector with data of the last completed vector, the processor is configured to:
compare the first incarnation identifier of the current version vector associated with the file with the second incarnation identifier of the last completed version vector associated with the file, wherein an incarnation identifier indicates a number of times one of the one or more nodes of a distributed backup system has restarted; and
compare the first transaction identifier of the current version vector associated with the file with the second transaction identifier of the last completed version vector associated with the file, wherein a transaction identifier indicates a number of transactions associated with the incarnation identifier;
determine that the data of the current version vector is greater than the data of the last completed version vector, wherein the data of the current version vector being greater than the data of the last completed version vector indicates the file is in an inconsistent state;
in response to a determination that the current version vector comprising the first incarnation identifier and the first transaction identifier is the greater than the data of the last completed version vector comprising the second incarnation identifier and the second transaction identifier, wait to access the file until the current version vector is less than or equal to the last completed version vector stored in the second data repository; and
in response to the current version vector comprising the first incarnation identifier and the first transaction identifier being less than or equal to the data of the last completed version vector comprising the second incarnation identifier and the second transaction identifier, access the file at least in part by:
read the file;
determine that an inconsistency for the file exists; and
fix the inconsistency at least in part by rolling back the file to a previous stable version of the file; and
a memory coupled to the processor and configured to provide the processor with instructions.

12. The system of claim 11, wherein to fix the inconsistency, the processor is configured to attempt to update the file based on a cached copy of a file update.

13. The system of claim 11, wherein the processor is further configured to perform the one or more file system operations on the file, wherein to perform the one or more file system operations on the file, the processor is further configured to:
generate a vector clock for a backup node, the vector clock including a corresponding incarnation identifier and a corresponding incremented transaction identifier relative to a previous transaction performed by the backup node;
update the current version vector associated with the file based on the generated vector clock;
perform one or more read or write operations on the file; and
upon completion of the one or more read or write operations, update the latest completed version vector associated with the file based on the generated vector clock.

14. The system of claim 11, wherein the processor is further configured to:
restart a backup node;
obtain an incarnation identifier from a previous version vector associated with the backup node; and
reset the first incarnation identifier and the first transaction identifier, wherein to reset the first incarnation identifier and the first transaction identifier, the processor is further configured to increment the first incarnation identifier relative to a previous incarnation identifier and setting the first transaction identifier to an initial, sequential value.

15. The system of claim 11, wherein the current version vector and last completed version vector further comprises a unique identifier of a backup node.

* * * * *